(12) United States Patent
Sudhues et al.

(10) Patent No.: US 12,004,453 B2
(45) Date of Patent: Jun. 11, 2024

(54) DRAPER HEAD WITH SECURING ACTION FOR A HEIGHT-ADJUSTABLE REEL

(71) Applicant: Carl Geringhoff GmbH & Co. KG, Ahlen (DE)

(72) Inventors: Steffen Sudhues, Ahlen (DE); Michael Pokriefke, Hude (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 918 days.

(21) Appl. No.: 17/064,611

(22) Filed: Oct. 7, 2020

(65) Prior Publication Data

US 2021/0105944 A1 Apr. 15, 2021

(30) Foreign Application Priority Data

Oct. 11, 2019 (DE) ...................... 10 2019 127 508.3

(51) Int. Cl.
*A01D 57/04* (2006.01)
*A01B 63/00* (2006.01)
(Continued)

(52) U.S. Cl.
CPC ............ *A01D 57/04* (2013.01); *A01B 63/002* (2013.01); *A01D 34/246* (2013.01);
(Continued)

(58) Field of Classification Search
CPC ...... A01B 63/002; A01D 57/04; A01D 57/20; A01D 69/005; A01D 41/148; A01D 41/141; A01D 41/1274; A01D 34/246; F15B 2211/20546; F15B 2211/20576; F15B 2211/30505; F15B 2211/3052;
(Continued)

(56) References Cited

U.S. PATENT DOCUMENTS 3,230,694 A * 1/1966 Fairbank ................ A01D 57/20
56/192
4,124,970 A * 11/1978 Bernhardt ............... A01D 57/04
56/DIG. 15
(Continued)

FOREIGN PATENT DOCUMENTS

AT 500237 A1 * 11/2005 ......... A01B 63/1006
CA 3079272 A1 * 10/2020 ........... A01B 63/008
(Continued)

*Primary Examiner* — Arpad Fabian-Kovacs
(74) *Attorney, Agent, or Firm* — Gudrun E. Huckett

(57) ABSTRACT

A harvester is provided with a draper head that has a frame extending substantially across a working width of the draper head. Cutting elements are arranged at a front side of the draper head and connected to the frame. Conveying surfaces and conveying members transport cut crop from the cutting elements to a discharge location of the draper head. A reel extends transversely to a working direction of the draper head across the working width of the draper head. Reel support arms are pivotably supported on the frame and support the reel. A hydraulic adjusting drive is operatively connected to the reel support arms to pivot the reel support arms to carry out a height adjustment of the reel. A hydraulic circuit is operatively connected to the hydraulic adjusting drive and has a hydraulic valve that is able to lock the hydraulic circuit.

22 Claims, 5 Drawing Sheets

(51) Int. Cl.
*A01D 34/24* (2006.01)
*A01D 41/127* (2006.01)
*A01D 41/14* (2006.01)
*A01D 57/20* (2006.01)
*A01D 69/00* (2006.01)
*F16H 61/4061* (2010.01)
*F16H 61/4139* (2010.01)

(52) U.S. Cl.
CPC ........ *A01D 41/1274* (2013.01); *A01D 41/141* (2013.01); *A01D 57/20* (2013.01); *A01D 69/005* (2013.01); *F15B 2211/20546* (2013.01); *F15B 2211/20576* (2013.01); *F15B 2211/30505* (2013.01); *F15B 2211/3052* (2013.01); *F15B 2211/5059* (2013.01); *F15B 2211/6336* (2013.01); *F15B 2211/7128* (2013.01); *F15B 2211/7135* (2013.01); *F15B 2211/7142* (2013.01); *F15B 2211/8633* (2013.01); *F16H 61/4061* (2013.01); *F16H 61/4139* (2013.01)

(58) Field of Classification Search
CPC ...... F15B 2211/5059; F15B 2211/6336; F15B 2211/7128; F15B 2211/7135; F15B 2211/7142; F15B 2211/8633; F16H 61/4061; F16H 61/4139
See application file for complete search history.

(56) References Cited

U.S. PATENT DOCUMENTS

| | | | | |
|---|---|---|---|---|
| 4,204,383 | A * | 5/1980 | Milliken, Jr. | A01D 57/00 56/DIG. 15 |
| 5,752,372 | A | 5/1998 | Buermann | |
| 7,726,107 | B2 * | 6/2010 | Dueckinghaus | A01D 69/03 56/11.9 |
| 9,717,179 | B2 * | 8/2017 | Trowbridge | F16H 61/4139 |
| 10,321,631 | B2 * | 6/2019 | Noll | A01D 41/141 |
| 10,595,462 | B2 * | 3/2020 | Hunt | A01D 41/141 |
| 10,820,513 | B2 * | 11/2020 | Hunt | F15B 13/021 |
| 11,337,371 | B2 * | 5/2022 | Hunt | A01D 75/00 |
| 2010/0293914 | A1 | 11/2010 | Killen et al. | |
| 2014/0075908 | A1 | 3/2014 | Surmann et al. | |
| 2019/0003495 | A1 * | 1/2019 | Hunt | A01D 57/04 |

FOREIGN PATENT DOCUMENTS

| | | | | |
|---|---|---|---|---|
| DE | 102015109191 A1 | * | 12/2015 | .......... A01D 41/141 |
| EP | 0208794 A1 | * | 1/1987 | ............ A01D 57/04 |
| EP | 3254546 B1 | * | 3/2019 | ............ A01B 63/10 |
| GB | 2 173 309 | | 10/1986 | |

* cited by examiner

DRAPER HEAD WITH SECURING ACTION FOR A HEIGHT-ADJUSTABLE REEL

BACKGROUND OF THE INVENTION

The invention relates to a harvester with an attachable draper head as well as to a draper head for attachment to a harvester. The draper head comprises a frame extending substantially across the working width of the draper head; cutting elements arranged at the front side of the draper head and connected to the frame; conveying surfaces and conveying members for conveying the cut crop from the cutting elements to a discharge location, wherein one of the conveying members is a reel that extends transversely to the working direction of the draper head across the working width of the draper head, and wherein the reel is supported by reel support arms that are attached pivotably to the frame and are height-adjustable by means of a hydraulic adjusting drive for height adjustment of the reel.

When in this specification "front" and "rear" are mentioned, these terms relate always to the working direction of the draper head. The working direction is the direction in which the draper head is moved in order to cut the crop.

A hydraulic adjusting drive of the reel of a draper head is comprised nowadays of one or a plurality of hydraulic cylinders with which the reel support arms are moved up and down. The hydraulic cylinder or cylinders are movable in that, for example, a 2/3-way hydraulic valve is switched such that either a hydraulic liquid is supplied from a hydraulic pump to the pressure side of the hydraulic cylinder when the reel is to be lifted or the hydraulic liquid can drain from the pressure side of the hydraulic cylinder when the reel is to be lowered. When the reel is to remain in an actual position of height, the hydraulic valve is positioned in a neutral position in which the hydraulic supply and drainage lines connected to the hydraulic valve are closed and therefore the pressure chamber of the hydraulic cylinders is closed off so that the hydraulic cylinder or cylinders cannot move. The described hydraulic valve is actuated during operation of the harvester by means of an operating lever in the driver's cabin in that the driver actuates a button "lift reel" or "lower reel" so that then the hydraulic valve is adjusted from the neutral position into the corresponding functional position for the duration of button actuation. When there is no actuation of a button for height adjustment of the reel, the hydraulic valve remains in the neutral position.

The known functionality of the 3/2-way hydraulic valve is sufficient for control of the reel height during operation of the harvester. The neutral position of the 3/2-way hydraulic valve by itself is however is not sufficient for securing a reel outside of the harvesting operation in a raised position such that below the reel, without additional securing measures, maintenance work at the draper head can be performed. There is a residual risk that the reel can drop in an uncontrolled fashion even in the neutral position of the 3/2-way valve.

Up to now, it is therefore necessary to secure the reel for maintenance work by moving the reel with the reel support arms into the uppermost position in order to then insert mechanical locks at each individual reel support arm so that the reel is secured against an accidental drop. The TruFlex draper heads of the company Carl Geringhoff Vertriebsgesellschaft mbH & Co. KG, Ahlen, Germany, are examples of such a securing action. When the maintenance work is completed, all mechanical locks must be removed again. This is associated with a significant time expenditure because the driver must walk several times around the entire draper head to insert the lock bars at different positions and subsequently remove them again. Such maintenance work may be required several times per day, for example, in order to exchange broken blades or to remove material that is clogging the draper head. The significant time expenditure and the loss of efficiency of the harvester caused thereby carry the risk that the users of the machine, when maintenance work is to be performed, do not use the mechanical securing action because it appears to be too time-consuming.

It is the object of the present invention to simplify securing of the reel during maintenance work at the draper head.

SUMMARY OF THE INVENTION

In accordance with the invention, this is achieved for a harvester of the aforementioned kind in that the hydraulic circuit to which the hydraulic adjusting drive is connected in operative drive connection comprises a separate locking function by means of a hydraulic valve.

The object is further solved for the draper head of the aforementioned kind in that the hydraulic circuit present at the draper head with which the hydraulic adjusting drive is connected in operative drive connection comprises a separate locking function by means of a hydraulic valve.

The locking action of the hydraulic adjusting drive by means of the separate locking function of the hydraulic circuit can be utilized as a protective measure during maintenance work against risks due to falling objects which are moved by the hydraulic circuit. The hydraulic locking action now provides that the hydraulic lines from and/or to the hydraulic adjusting drive are blocked by means of a hydraulic valve. The hydraulic valve is adjustable between a switching position in which it locks the hydraulic circuit and a switching position in which it unlocks the hydraulic circuit. When the hydraulic lines and hydraulic cylinders are locked by the hydraulic valve and are seal-tight, a hydraulic adjusting drive can no longer move when the flow of hydraulic fluid in the hydraulic valve is blocked.

The separate locking function is not performed by the conventional button for lifting or lowering the reel but it is a separate safety switch which is provided solely for activation of the securing function. Therefore, a conscious decision is required wanting to protect the reel against accidental lowering. The switch must be separately actuated in order to perform a securing action and to cancel it again. The safety switch can be provided at the harvester and/or at the draper head. The hydraulic circuit which can be secured by means of the safety switch is thus not limited to the part which is provided at the draper head but can also extend to parts of a hydraulic circuit which forms a component of the hydraulic circuit of the harvester.

For securing against risks from suspended loads, it is sufficient when the driver of the harvester at the beginning of maintenance work actuates the safety switch in order to block thereby the flow of hydraulic liquid through the hydraulic valve and to secure the reel against the risks of suspended loads. With a one-time actuation of the safety switch, the driver of the harvester can block all hydraulic cylinders, used at the draper head for movement of the reel support arms, against undesirable movements. This means significant time savings for the driver. He can cancel the locking action by again actuating the safety switch once; in this way, current supply to the hydraulic valves is effected again. It is no longer required to walk to each individual reel support arm in order to insert therein and later remove therefrom mechanical securing devices. The actuation of a single safety switch is sufficient which can be done by walking along the machine when the safety switch is positioned at a convenient location. The quick and uncomplicated switching on and switching off of the securing action increases the probability that the securing action is indeed activated when needed.

According to an embodiment of the invention, the hydraulic valve is an electrically controlled hydraulic valve that upon interruption of the current supply is forced to move into the closed position by means of a mechanical spring reset. The hydraulic valve can be switched, for example, by means of the electrical excitation of a solenoid. Upon interruption of the current supply, the solenoid is without current which could lead to an uncontrolled drop of the reel from the raised position. The hydraulic valve is then however forced into its closed position by means of the mechanical spring reset independent of the current supply. By the combination of electrical control of the valve with a mechanical spring reset, the hydraulic valve can be switched easily by means of an electrical switch between a first position, in which the hydraulic valve permits movements of the hydraulic drive, and a second position, in which the hydraulic valve does not permit movements of the hydraulic drive, wherein however by means of the mechanical spring reset it is ensured that the hydraulic valve reliably blocks movement of the hydraulic drive even when the current supply is interrupted. The blocking action thus remains safely in effect in particular in case the current supply of the solenoid valve should fail so that the system is intrinsically safe. The hydraulic circuit is therefore always secured against uncontrolled dropping of the reel from a lifted maintenance position and fulfills therefore the increased requirements in regard to safety with respect to securing against suspended loads.

According to an embodiment of the invention, the hydraulic valve blocks the supply and return lines of the hydraulic adjusting drive. By blocking the supply line as well as the return line, a dual safety is provided because the hydraulic adjusting drive is blocked from the supply side as well as from the return side against accidental movements.

According to an embodiment of the invention, the hydraulic valve is a solenoid valve; at the draper head and/or at the harvester a safety switch is present which is connected with the electric circuit of the electric solenoid valve and, by actuation of the safety switch, the hydraulic valve is separated from the current supply. When the driver of the harvester pushes down the safety switch, the electrical supply is interrupted in order to secure the reel against the risks presented by suspended loads. This means a significant time savings for the driver. The locking action can be canceled again in that the driver actuates the safety switch again and thereby reestablishes the current supply of the hydraulic valves. The actuation of a single safety switch is all it takes.

According to an embodiment of the invention, the safety switch is connected to an electronic control unit and is remotely actuatable by the electronic control unit when a triggering criterion is met. The remote actuation can be realized by means of a cable-bound signal, for example, a direct connecting line or a bus network, or by means of a radio signal or light signal received by the safety switch and converted into a corresponding adjusting signal transmitted to the hydraulic valve. The possibility of locking an actual reel position is not only advantageous in case of maintenance work but also in certain operational situations of the draper head. Since the operation of a harvester is monitored increasingly with a corresponding electronic control unit, the latter is in particular suitable in order to lock, when a need is recognized, an actual reel position in that, by means of a connection between the safety switch and the electronic control unit, a corresponding blocking command is transmitted from the electronic control unit to the safety switch. That a triggering criterion for blocking an actual reel position is existing, can result from a manual operating input of the driver of the harvester to the control electronic unit but also can result from software-supported control or working routines of the electronic control unit or alarm signals of sensors connected to the electronic control unit. The electronic control unit can be not only in the form of the electronic control unit of the harvester but can be also in the form of an electronic control unit that is present in the draper head and is autonomous from the harvester or can be an additional electronic unit for the draper head that is integrated in or is separate from the electronic control unit of the harvester.

According to an embodiment, the electronic control unit is connected to a sensor which determines the actual height adjustment of the draper head, the actual operating mode of the draper head and/or the locking status of individual draper head components.

The sensor value for the actual height adjustment of the draper head can be of interest, for example, when the draper head is operated very close to the ground and evasion movements of the draper head as a whole or of draper head parts in upward direction must be expected when the draper head is moved across ground elevations. In such operating conditions, it is recommended that the reel is not held in a low position closely above the cutter bar when the reel tines, already for minimal upward movements of the cutter bar or of other parts of the draper head, might collide with the cutter bar or other parts of the draper head. Due to the sensor data of the sensor for determining the actual height adjustment of the draper head, the electronic control unit can prevent lowering of the reel into a region in which damage of the reel tines is imminent when the electronic control unit, when a threshold value is reached, locks the adjusting drive by an adjusting signal sent to the safety switch.

Likewise, a locking action of the hydraulic adjusting drive can be expedient when initiated from a certain low reel position on in case that, already due to the actual activated operating mode of the draper head with a very close ground copying action of the draper head and of the cutter bar, a damage to the cutter bar is to be expected with reasonable probability for a distance of the reel from the cutter bar that is too small. Therefore, the electronic control unit can lock the hydraulic adjusting drive by a command sent to the safety switch when the driver of the harvester, in case of a draper head operating in a ground copying mode, attempts to further lower the reel than would appear possible in this operating mode of the draper head without causing damage.

A stroke limitation for the reel is expedient in order to ensure that the reel tines that are connected to the reel for a further lowering of the reel do not reach the action range of the blades of the cutter bar. Depending on how flexible the cutter bar is secured at the draper head, different distance values may be expedient. For example, for a rigidly attached cutter bar a distance of the reel tine tips of 50 mm from the cutter bar may be sufficient in order to preclude the risk that the reel tine tips can come into contact with the cutter bar and could be cut off or could cause the blades to break. When the cutter bar is however supported at height-adjustable support arms or rocker arms so that the cutter bar can adapt better to a ground contour, a minimum distance of, for example, 200 mm may be expedient. Depending on the mode in which the draper head is operating, the hydraulic valves as a function of the selected operating mode can be electrically switched and controlled such that the stroke limitation that matches the actual operating mode is switched on. The stroke limitation can be activated automatically by means of a draper head-associated or harvester-associated software or by input from the operator.

The electronic control unit can also lock the hydraulic adjusting drive when certain draper head components are not locked, for example, the support arms that are secured at the frame and support the cutter bar and are pivotable but can be locked with respect to the pivot movements. When the support arms are not locked, they can pivot together with the cutter bar so far upwardly that a collision with the reel is impending if the latter is positioned too low. Such a low reel position can be prevented by a corresponding locking action of the hydraulic adjusting drive at a sufficient height.

Finally, a locking action of the reel in particular at a minimal distance from the cutter bar is however conceivable. This can be of interest, for example, when the draper head has been lifted, as is done when reaching the end of a field, and the reel is supposed to transport the crop that has just been cut reliably away by being in a particularly low position. In this case, by means of an automatic end-of-field operation of the harvester or a manual input of the driver of the harvester, a cleaning function can be activated in which the reel is locked in a low position in which it brushes across the cutter bar and the leading conveying surface of the draper head and cannot be lifted from this low position without canceling the locking action. The activation of the cleaning function can be combined with a sensor query in order to clarify, for example, whether a minimum level of the draper head for initiating the lowering movement of the reel has been reached and/or whether the pivoting action of the support arms has been locked.

According to an embodiment of the invention, the hydraulic adjusting drive is lockable in a preselectable maximum lifting height of the reel or a maximum lifting height that is predetermined by the electronic control unit. Due to the locking action of the hydraulic adjusting drive, lifting commands that are input by the driver of the harvester and are not expedient or even carry the risk of damage in the actual operating position can be blocked when surpassing a certain lifting height of the reel. Such locking actions fora maximum lifting height are particularly expedient when the reel lifted past the predetermined maximum lifting height would collide with the driver's cabin when the draper head is lifted very high.

According to an embodiment of the invention, the hydraulic valve and/or the supply and/or return lines of the hydraulic adjusting drive are provided with a sensor for determining oil leakage flows which triggers a warning signal upon detection of an oil leakage flow. By means of the detection of oil leakage flows, an imminent accidental lowering of the reel during maintenance work can be detected early on and a corresponding warning signal can be generated. Possibly remaining minimal risks of injuries of the maintenance personnel can be additionally reduced by the warning signal that is emitted early on.

According to an embodiment of the invention, the hydraulic valve is arranged at the draper head. By the direct arrangement of the hydraulic valve at the draper head, it is possible to secure the hydraulic circuit directly upstream of the hydraulic adjusting drive. The part of the hydraulic circuit secured by the hydraulic valve remains therefore as small as possible in order to secure with it only the reel against uncontrolled lowering. In this way, also a possible residual risk of possible leakages, line breaks, and other functional failures is limited to an unavoidable minimum. Only the hydraulic lines and hydraulic cylinders which are mounted at the draper head, including the respective connectors and hydraulic valves that are possibly arranged downstream of the hydraulic valve used as a locking action, are secured. Errors and failures of the hydraulic circuit which is mounted at the harvester can thus not disturb or impair the safety of the hydraulic locking action of the reel.

According to an embodiment of the invention, the safety switch is located on the left rear side or the top side of the left frame of the draper head, viewed in the working direction of the draper head. Since the driver of a harvester usually exits at the left machine side from the cabin of the harvester, the safety switch is positioned in this region so as to be easily accessible for the driver. The driver can secure the reel against undesirable lowering as he passes by simply by pushing the safety switch and he can cancel this securing action by pushing the safety switch again. Additional working steps or walks around the machine are not required for securing purposes.

According to an embodiment of the invention, the hydraulic valve is embodied as a hydraulically releasable check valve that blocks return flow from the hydraulic circuit but enables pressure-side flow of hydraulic liquid for unlocking (releasing) the hydraulic valve. Such a solution is expedient when the reel is lifted by simply acting hydraulic cylinders which are connected by a common supply and drainage line to the hydraulic system of the harvester. When it is not possible to send an electrical signal from the driver's cabin to the hydraulic valve for unlocking because no corresponding line is provided or existing and when the reel is in a blocked region, it is at least possible by means of the check valve function of the hydraulic valve to supply additional hydraulic liquid to the hydraulic cylinder and to move the reel so far that it is in a region that is also electrically unlocked. In this way, a hydraulic unlocking instead of an electrical unlocking of the hydraulic valve is possible also.

According to an embodiment of the invention, the hydraulic valve is correlated with the adjusting drives for a single or a plurality of reel support arms. By correlating a respective hydraulic valve for the adjusting drive of an individual or a plurality of reel support arms or for a plurality of adjusting drives for a plurality of reel support arms, a one-part reel can be secured already by blocking only one hydraulic cylinder. In case of reels that are comprised of a plurality of reel parts that cover only a partial working width, it is possible to only block individual reel parts at a selected height that they should not surpass or undershoot. The reel parts, as needed, are then lockable at different adjusting heights relative to each other.

Further features of the invention result from the claims, the figures, and the figure description. All of the aforementioned features and feature combinations disclosed in the description as well as the features and feature combinations which are mentioned in the following in the figure description and/or shown only in the figures are not only usable in the respectively indicated combination but also in other combinations or individually.

BRIEF DESCRIPTION OF THE DRAWING

The invention will now be explained with the aid of a preferred embodiment as well as with reference to the attached drawings in more detail.

DESCRIPTION OF THE PREFERRED EMBODIMENTS

Figure 1:
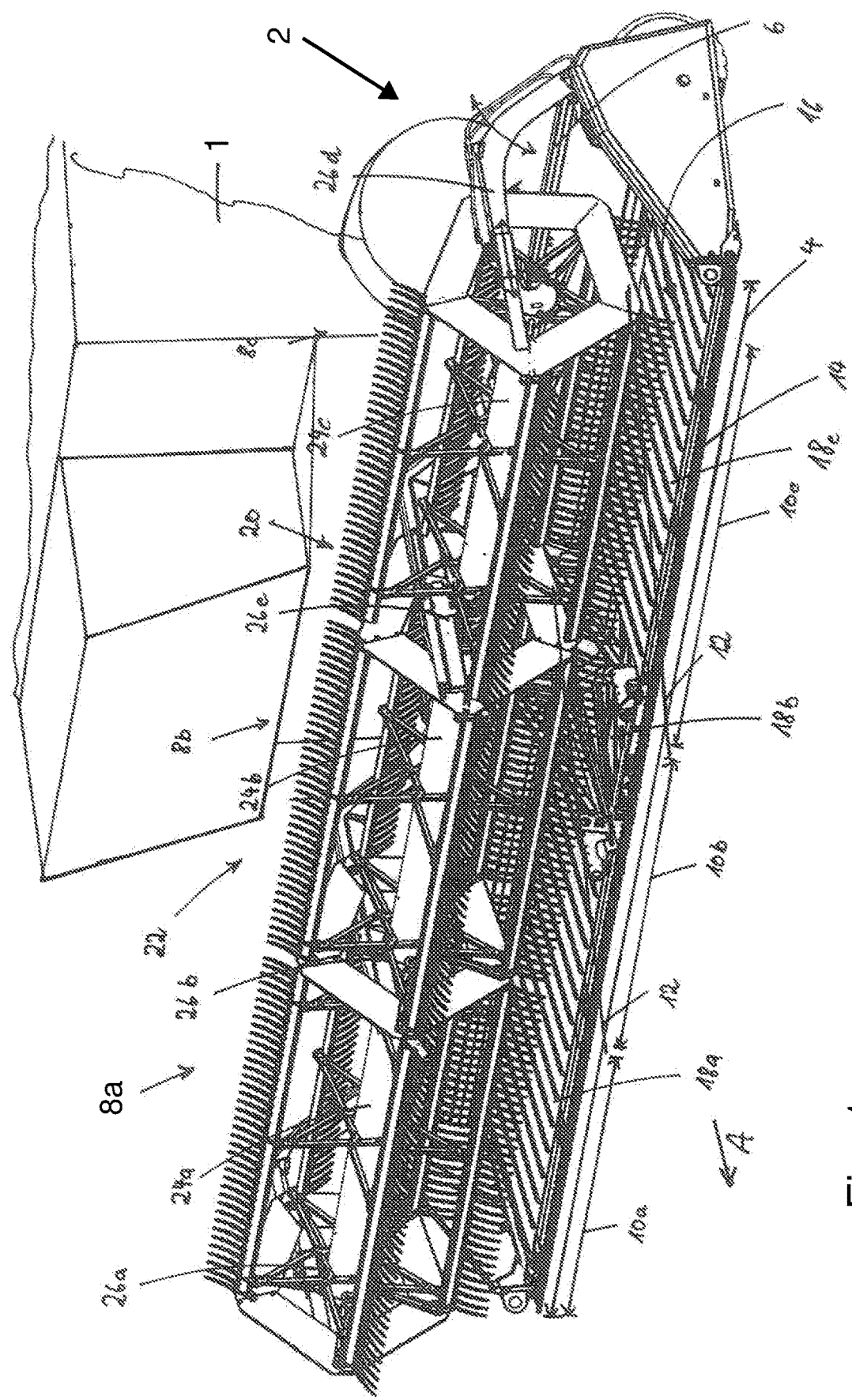
FIG. 1 is a perspective front view of a draper head.

FIG. 1 shows a perspective front view of a draper head 2. The draper head 2 comprises a working width 4. The draper head 2 is comprised of a frame 6 that is comprised of three frame parts 8a, 8b, 8c. Each frame part 8a, 8b, 8c covers a corresponding partial working width 10a, 10b, 10c. In relation to the central frame part 8b, the two outer frame parts 8a, 8c are pivotable about axes 12 which extend in working direction A of the draper head 2. However, for the invention it is without consequence whether the draper head is provided with a one-part or multi-part frame and whether the frame parts are connected pivotably to each other or not. The invention will be explained in the following with the aid of an embodiment in the form of a three-part draper head.

At the front side of the draper head 2, a cutter bar as a cutting element 14 is attached. The cutter bar is driven in an oscillating fashion and comprises a plurality of blades that cut the crop standing on the field. Upon forward travel of the harvester into the upright crop on the field, the cut crop drops onto the conveying surfaces 16 in the draper head 2. By means of conveying members 18 (in the embodiment the two outer belt conveyors 18a, 18c that carry the cut crop transverse to the working direction A to the center of the draper head 2 and the belt conveyor 18b that conveys in the central region of the draper head 2 the collected crop to the rear) the crop is transported away from the cutting elements 14 to the discharge location 20. The cut crop is transferred to the harvester at the discharge location 20.

So that during cutting the stems of the crop enter the cutting element 14 properly, do not laterally drop away, and after the cut are placed properly onto the conveying surface, a rotatingly driven reel 22 is provided above the cutting element 14. In the embodiment, the reel 22 is of a three-part configuration and comprises the reel parts 24a, 24b, 24c. In the region of the separation locations between the reel parts 24a, 24b, 24c, the reel support arms 26b, 26c are located. The reel 22 contacts as it rotates the crop stems and throws them opposite to the travel direction A onto the conveying surface 16.

The reel parts 24a, 24b, 24c are supported by the reel support arms 26a, 26b, 26c, 26d. The centrally arranged reel part 24b is supported by the reel support arms 26b, 26c which also hold inwardly pointing shaft stubs of the reel shafts of the outer reel parts 24a, 24c. The reel support arms 26b, 26c support thus respectively the shaft stubs of two reel parts while the outer reel support arms 26a, 26d support only the outwardly pointing shaft stubs of the outer reel parts 24a, 24c. The reel support arms 26 are adjustable in the direction of the double arrow in vertical direction so that different height adjustments of the reel 22 are provided. The reel parts 24a, 24b, 24c are adjustable additionally in horizontal direction which is also indicated by a double arrow.

Figure 2:
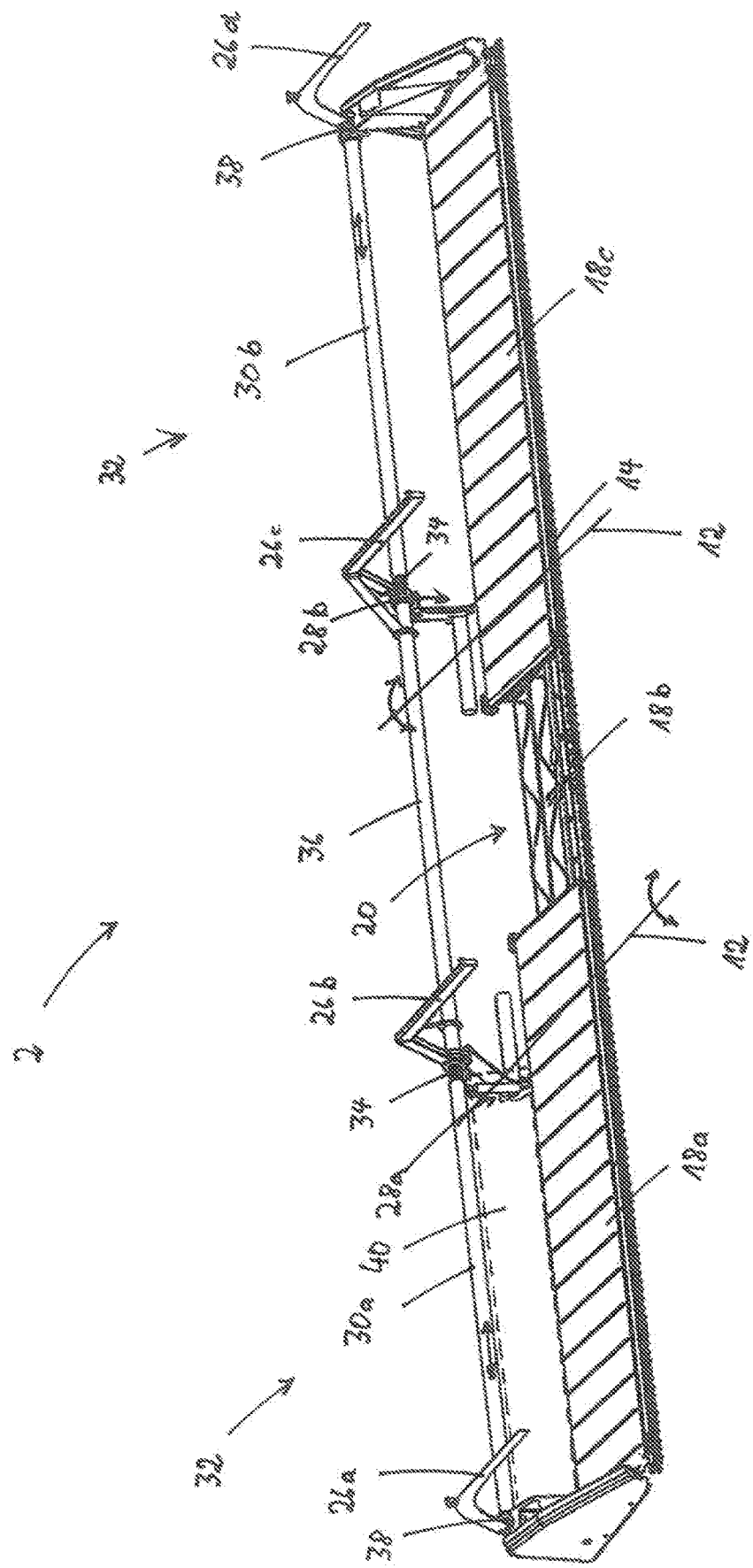
FIG. 2 is a perspective front view of the support structure without reel parts.

FIG. 2 shows a perspective front view of a draper head 2 without the frame 6, the reel parts 24a, 24b, 24c, and other components. In this reduced illustration, it can be seen very well that the reel support arms 26a, 26b are adjustable by the hydraulic adjusting drive 28a and the reel support arms 26c, 26d by means of the hydraulic adjusting drive 28b. The reel support arms 26a, 26b are connected by the torsion shaft 30a to each other while the reel support arms 26c, 26d are connected by the torsion shaft 30b to each other. An adjusting movement that is performed by a hydraulic adjusting drive 28a, 28b on a reel support arm 26b, 26c is transmitted by the torsion shafts 30a, 30b also to the reel support arms 26a, 26d. The reel support arms 26a, 26b with the torsion shaft 30a as well as the reel support arms 26c, 26d with the torsion shaft 30b each form a reel support structure in order to hold the reel parts 24a and 24c. The reel support arms 26b, 26c can additionally also hold the central reel part 24b. The central reel part 24b is then pivoted together with the reel parts 24a, 24c depending on how the reel support arms 24b, 24c are moved.

Since the frame parts 8a, 8c are pivotable about the central frame part 8b about the axes 12 and since the torsion shafts 30a, 30b are arranged spaced apart from the axes 12 in vertical direction, length differences at the outer ends of the torsion shafts 30a, 30b in relation to the outer ends of the corresponding frame parts 8a, 8c are created when corresponding pivot movements are carried out; this is indicated by the respective double arrows. The torsion shafts 30a, 30b are held and supported at fixed bearing points 34. In the embodiment, the two fixed bearing points 34 are designed as universal joints through which the torsion shafts 30a, 30b are fixedly connected to each other by an intermediate shaft 36. In order to be able to compensate relative movements between the frame parts 8a, 8c and the torsion shafts 30a, 30b in axial direction of the torsion shafts 30a, 30b, the torsion shafts 30a, 30b at their outer ends are connected by slide bearings 38 with the frame parts 8a, 8c. The torsion shafts 30a, 30b can thus slide in the axial direction in the slide bearings 38.

FIG. 2 shows that at the torsion shaft 30a also a rear wall 40, shown in dashed lines, can be attached.

Figure 3:
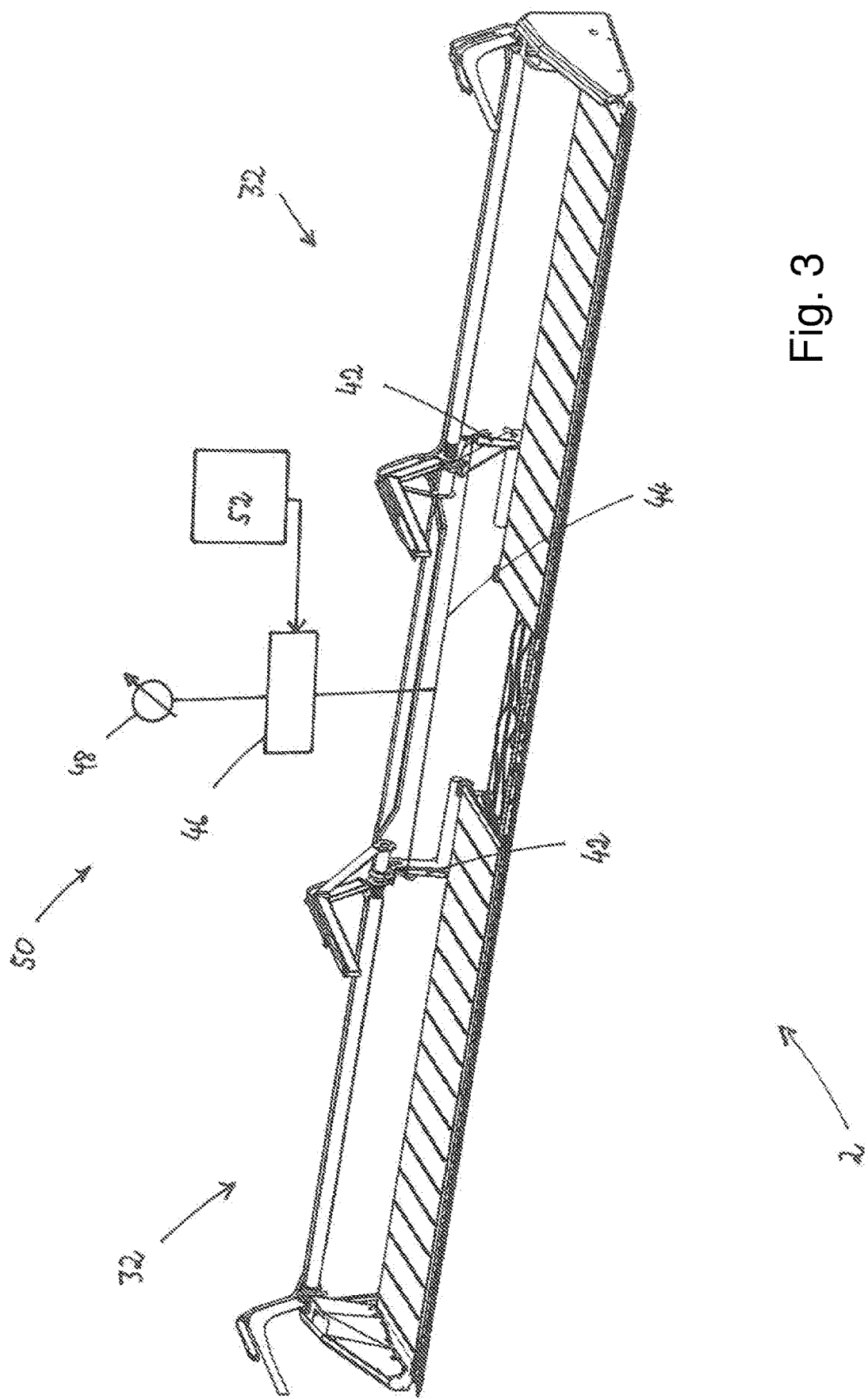
FIG. 3 shows the support structure illustrated in FIG. 2 without intermediate shaft in a different perspective.

The draper head 2, shown in a simplified illustration in FIG. 2, is shown in FIG. 3 with support structures 32 that are not connected by an intermediate shaft 36. In the view illustrated in FIG. 3, the hydraulic cylinders 42 can however be seen which in the embodiment form the respective hydraulic adjusting drives 28a, 28b. The hydraulic cylinders 42 form together with the hydraulic lines 44, the hydraulic valve 46, and the hydraulic pump 48 a component of a hydraulic circuit 50. In FIG. 3, the hydraulic lines 44 are illustrated only as a simple line for simplifying the illustration. It is understood however that the hydraulic lines 44 in a hydraulic circuit are provided with corresponding supply and return lines and correspondingly configured hydraulic valves 46.

By means of a hydraulic valve 46, the hydraulic circuit can be completely locked toward the hydraulic cylinders 42. This is possible by means of a 2/2-way valve. In the closed position of the 2/2-way valve, the 2/2-way valve blocks any flow of hydraulic liquid so that the hydraulic cylinders 42 are blocked in the actual extended position. The hydraulic circuit functions in this way as a static securing action of the suspended load of the reel 22 below which then maintenance work can be performed such as, for example, the exchange of blades at the cutting element 14 or the removal of material accumulations on the conveying surfaces 16 or at the conveying members 18. The 2/2-way valve, for example, can be electrically controlled, for example, by means of an electronic control unit 52. The electronic control unit 52 can be designed as a switch with which a simple on/off switching action is possible, or it is a complex electronic control unit 52 in which software-supported operating input by means of keys or touch screen surfaces at an operating panel is possible.

Figure 4:
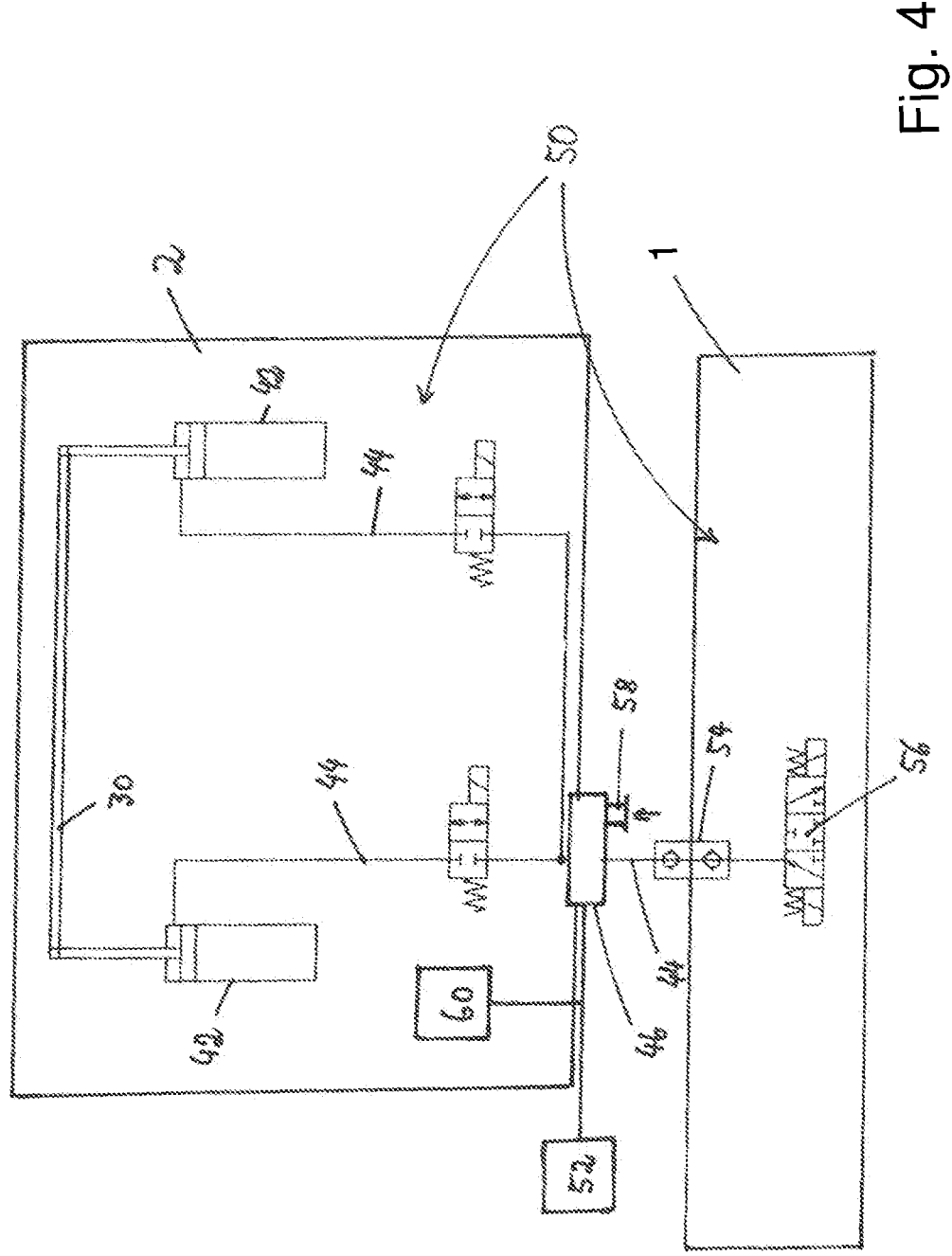
FIG. 4 shows a hydraulic circuit diagram for the reel height adjustment.

FIG. 4 shows a schematic hydraulic circuit diagram for the reel height adjustment. A draper head 2 is attached to the harvester 1. The hydraulic system of the draper head 2 is connected to the hydraulic system of the harvester 1 by means of a hydraulic coupling 54. Lifting and lowering of the reel 22 is controlled by corresponding switching positions of the 3/2-way hydraulic valve 56. At the draper head 2, the hydraulic valve 46 is provided with which the supply and drainage of the hydraulic liquid to and from the draper head 2 can be blocked with a corresponding switching position of the hydraulic valve 46. At the hydraulic valve 46, there is a safety switch 58 whose actuation moves the hydraulic valve 46 into a switching position in which it blocks the hydraulic line 44 so that no hydraulic liquid can flow anymore between the harvester 1 and the draper head 2.

Figure 5:
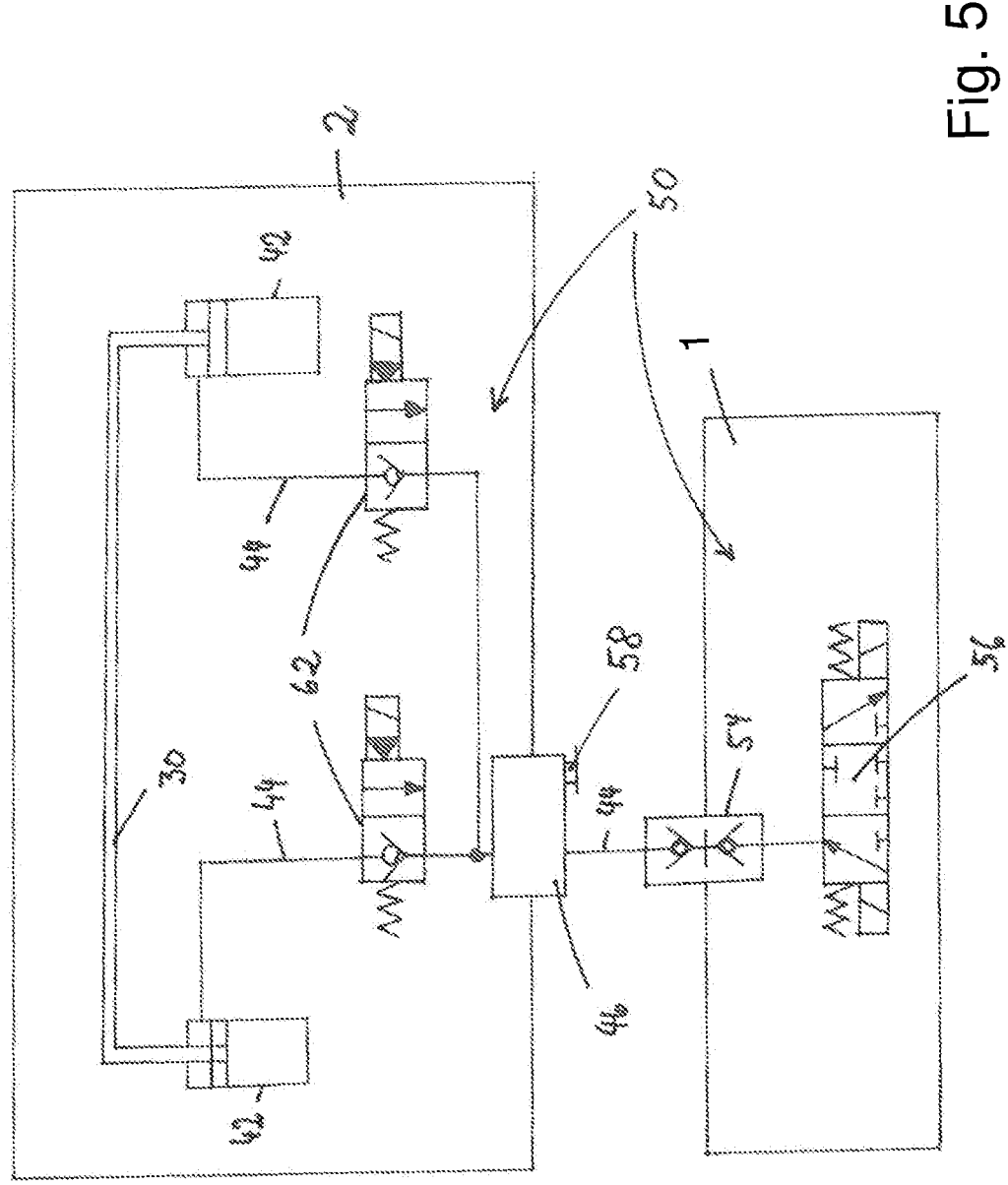
FIG. 5 shows a hydraulic circuit diagram with hydraulic valves with a bypass.

The hydraulic valve 46 is connected to an electronic control unit 52 which in the embodiment is a component of the draper head 2. In deviation from the embodiment, the electronic control unit 52 can also be arranged at the harvester 1. The electronic control unit 52 is connected to the sensor 60 which determines the actual height adjustment of the draper head 2, the actual operating mode of the draper head 2, or the locking status of individual draper head components. FIG. 5 shows a hydraulic circuit 50 which comprises two electrically releasable check valve 62. The check valves 62 block in a switching position the return flow from the hydraulic circuit 50 but they enable the supply through the check valve 62. Such a solution is expedient when the reel 22 is lifted with simply acting hydraulic cylinders 42 which are connected by means of a common supply and drainage line to the hydraulic system of the harvester 1.

The invention is not limited to the afore described embodiments. A person of skill in the art will have no difficulty in modifying the embodiments in a suitable way in order to adapt them to concrete applications.

The specification incorporates by reference the entire disclosure of German priority document 10 2019 127 508.3 having a filing date of Oct. 11, 2019.

While specific embodiments of the invention have been shown and described in detail to illustrate the inventive principles, it will be understood that the invention may be embodied otherwise without departing from such principles.

LIST OF REFERENCE CHARACTERS 1 harvester
2 draper head
4 working width
6 frame
8 frame part
10 partial working width
12 axis
14 cutting element
16 conveying surface
18 conveying member
20 discharge location
22 reel
24 reel part
26 reel support arm
28 adjusting drive
30 torsion shaft
32 reel support structure
34 bearing point
36 intermediate shaft
38 slide bearing
40 rear wall
42 hydraulic cylinder
44 hydraulic line
46 hydraulic valve
48 pump
50 hydraulic circuit
52 electronic control unit
54 hydraulic coupling
56 3/2-way hydraulic valve
58 safety switch
60 sensor
62 check valve

What is claimed is:

1. A harvester comprising:
a draper head comprising:
a frame extending substantially across a working width of the draper head;
cutting elements arranged at a front side of the draper head and connected to the frame:
conveying surfaces and conveying members configured to transport cut crop from the cutting elements to a discharge location of the draper head;
a reel extending transversely to a working direction of the draper head across the working width of the draper head;
reel support arms pivotably supported on the frame and supporting the reel;
a hydraulic adjusting drive operatively connected to the reel support arms to pivot the reel support arms to carry out a height adjustment of the reel;
a hydraulic circuit operatively connected to the hydraulic adjusting drive and comprising a hydraulic valve configured to lock the hydraulic circuit, wherein the hydraulic valve is an electrically controlled hydraulic valve connected to an electric circuit;
an electronic control unit configured to control operations of the harvester and/or the draper head;
a safety switch connected to the electric circuit, wherein the safety switch is a component separate from the electronic control unit and is arranged at the draper head or at a component of the harvester;
wherein the safety switch, when actuated, separates the hydraulic valve from a current supply of the electric circuit to lock the hydraulic circuit.

2. The harvester according to claim 1, wherein the hydraulic valve comprises a mechanical spring reset configured to move the hydraulic valve into a closed position when a connection to the current supply is interrupted.

3. The harvester according to claim 2, wherein the hydraulic valve blocks supply and return lines of the hydraulic adjusting drive in the closed position.

4. The harvester according to claim 1, wherein the hydraulic valve is a solenoid valve.

5. The harvester according to claim 4, wherein the safety switch is connected to the electronic control unit and the electronic control unit is configured to remotely actuate the safety switch when a triggering criterion is met.

6. The harvester according to claim 5, further comprising a sensor, wherein the sensor is configured to determine an actual height adjustment of the draper head or an actual operating mode of the draper head or a locking status of individual draper head components, wherein the sensor is connected to the electronic control unit.

7. The harvester according to claim 5, wherein the hydraulic adjusting drive is configured to be locked when a maximum lifting height of the reel is reached, wherein the maximum lifting height is selectable by an operator or is predetermined by the electronic control unit.

8. The harvester according to claim 4, wherein, when viewed in the working direction of the draper head, the safety switch is located at a left rear side of the draper head or at a top side of a left frame part of the frame.

9. The harvester according to claim 1, wherein the hydraulic valve is provided with a sensor configured to detect oil leakage flows, wherein the sensor is configured to emit a warning signal when an oil leakage flow is detected.

10. The harvester according to claim 1, wherein the hydraulic valve is arranged at the draper head.

11. The harvester according to claim 1, wherein the hydraulic circuit further comprises an electrically releasable check valve configured to block a return flow from the hydraulic circuit but configured to enable a supply flow therethrough.

12. The harvester according to claim 1, wherein the hydraulic valve is correlated with the hydraulic adjusting drive configured to act on an individual one of the reel support arms or a plurality of the reel support arms.

13. A draper head for attachment to a harvester, the draper head comprising:
- a frame extending substantially across a working width of the draper head;
- cutting elements arranged at a front side of the draper head and connected to the frame:
- conveying surfaces and conveying members configured to transport cut crop from the cutting elements to a discharge location of the draper head;
- a reel extending transversely to a working direction of the draper head across the working width of the draper head;
- reel support arms pivotably supported on the frame and supporting the reel;
- a hydraulic adjusting drive operatively connected to the reel support arms to pivot the reel support arms to carry out a height adjustment of the reel;
- a hydraulic circuit operatively connected to the hydraulic adjusting drive and comprising a hydraulic valve configured to lock the hydraulic circuit, wherein the hydraulic valve is an electrically controlled hydraulic valve connected to an electric circuit;
- a safety switch connected to the electric circuit, wherein the safety switch is a component separate from an electronic control unit configured to control operations of the harvester and/or the draper head and is arranged at the draper head;
- wherein the safety switch, when actuated, separates the hydraulic valve from a current supply of the electric circuit to lock the hydraulic circuit.

14. The draper head according to claim 13, wherein the hydraulic valve.

15. The draper head according to claim 14, wherein the safety switch is configured to be connected to the electronic control unit and the electronic control unit is configured to remotely actuate the safety switch when a triggering criterion is met.

16. The draper head according to claim 15, further comprising a sensor, wherein the sensor is configured to determine an actual height adjustment of the draper head or an actual operating mode of the draper head or a locking status of individual draper head components, wherein the sensor is connected to the electronic control unit.

17. The draper according to claim 16, wherein the hydraulic adjusting drive is configured to be locked when a maximum lifting height of the reel is reached, wherein the maximum lifting height is selectable by an operator or is predetermined by the electronic control unit.

18. The draper head according to claim 13, wherein the hydraulic valve comprises a mechanical spring reset configured to move the hydraulic valve into a closed position when a connection to the current supply is interrupted.

19. The draper head according to claim 18, wherein the hydraulic valve blocks supply and return lines of the hydraulic adjusting drive in the closed position.

20. The draper head according to claim 13, wherein the hydraulic valve is provided with a sensor configured to detect oil leakage flows, wherein the sensor is configured to emit a warning signal when an oil leakage flow is detected.

21. The draper head according to claim 13, wherein the hydraulic circuit further comprises an electrically releasable check valve configured to block a return flow from the hydraulic circuit but configured to enable a supply flow therethrough.

22. The draper head according to claim 13, wherein the hydraulic valve is correlated with the hydraulic adjusting drive configured to act on an individual one of the reel support arms or a plurality of the reel support arms.

* * * * *